US011794730B2

(12) United States Patent
Sypitkowski et al.

(10) Patent No.: US 11,794,730 B2
(45) Date of Patent: Oct. 24, 2023

(54) DETECTING DAMAGE ANGLES FOR A VEHICLE AND TRAILER

(71) Applicant: Robert Bosch GmbH, Stuttgart (DE)

(72) Inventors: Greg Sypitkowski, Farmington Hills, MI (US); Steffen Abraham, Hildensheim (DE); James Stephen Miller, Dexter, MI (US)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 17/282,461

(22) PCT Filed: Oct. 16, 2019

(86) PCT No.: PCT/EP2019/078110
§ 371 (c)(1),
(2) Date: Apr. 2, 2021

(87) PCT Pub. No.: WO2020/079092
PCT Pub. Date: Apr. 23, 2020

(65) Prior Publication Data
US 2021/0380100 A1    Dec. 9, 2021

Related U.S. Application Data

(60) Provisional application No. 62/747,955, filed on Oct. 19, 2018.

(51) Int. Cl.
*B60W 30/09*    (2012.01)
*B60W 30/095*    (2012.01)
(Continued)

(52) U.S. Cl.
CPC ........ *B60W 30/09* (2013.01); *B60W 30/0953* (2013.01); *B60W 40/12* (2013.01);
(Continued)

(58) Field of Classification Search
CPC .................................................... B60W 30/09
See application file for complete search history.

(56) References Cited

U.S. PATENT DOCUMENTS 9,290,204 B2 *   3/2016   Lavoie .................. B60W 40/10
9,511,799 B2    12/2016   Lavoie
(Continued)

FOREIGN PATENT DOCUMENTS

DE    102005027846 A1    12/2006
DE    102012006206 A1    10/2013
(Continued)

OTHER PUBLICATIONS

International Search Report and Written Opinion for Application No. PCT/EP2019/078110 dated Feb. 14, 2020 (10 pages).

*Primary Examiner* — Michael A Berns
(74) *Attorney, Agent, or Firm* — Michael Best & Friedrich LLP

(57) ABSTRACT

Detecting a damage angle between a vehicle and a trailer. One example system includes an electronic controller and a rear-view camera configured to obtain video of the trailer. The electronic controller is configured to receive the video of the trailer from the rear-view camera and determine a damage point based upon the video of the trailer. The electronic controller is further configured to determine a change in a rotation angle of the trailer and determine a changed location of the damage point of the trailer based upon the change in the rotation angle of the trailer. The electronic controller is also configured to determine a damage angle based upon the changed location of the damage point relative to the vehicle and determine at least one maneuver to avoid collision between the damage point and the vehicle based upon the damage angle.

20 Claims, 5 Drawing Sheets

(51) Int. Cl.
*B60W 40/12* (2012.01)
*B60W 50/14* (2020.01)
*G06V 20/56* (2022.01)

(52) U.S. Cl.
CPC ............ *B60W 50/14* (2013.01); *G06V 20/56* (2022.01); *B60W 2050/146* (2013.01); *B60W 2300/14* (2013.01); *B60W 2420/42* (2013.01); *B60W 2520/22* (2013.01); *B60W 2720/10* (2013.01); *B60W 2720/22* (2013.01)

(56) References Cited

U.S. PATENT DOCUMENTS

| | | | |
|---|---|---|---|
| 9,513,103 B2 * | 12/2016 | Crossman | B60W 10/20 |
| 9,527,528 B1 | 12/2016 | Harrison | |
| 9,821,845 B2 | 11/2017 | Xu et al. | |
| 10,065,677 B2 | 9/2018 | Shepard | |
| 10,106,282 B2 * | 10/2018 | Daniel | B65B 43/59 |
| 10,160,382 B2 * | 12/2018 | Pliefke | B60D 1/245 |
| 10,300,855 B2 * | 5/2019 | Lu | B60R 1/002 |
| 10,481,255 B2 * | 11/2019 | Prasad | H04N 7/183 |
| 11,267,508 B2 * | 3/2022 | Lavoie | B62D 13/06 |
| 11,436,838 B2 * | 9/2022 | Niewiadomski | G06V 20/56 |
| 11,605,295 B2 * | 3/2023 | Niewiadomski | G08G 1/16 |
| 2014/0324295 A1 | 10/2014 | Lavoie | |
| 2015/0217693 A1 | 8/2015 | Pliefke et al. | |
| 2018/0043828 A1 | 2/2018 | Lu et al. | |
| 2018/0045823 A1 | 2/2018 | Prasad et al. | |
| 2021/0380100 A1 * | 12/2021 | Sypitkowski | B60W 30/0953 |

FOREIGN PATENT DOCUMENTS

| | | |
|---|---|---|
| DE | 102014220269 A1 | 4/2016 |
| GB | 2513392 A | 10/2014 |

* cited by examiner

CAM : CAMERA

TB : TRAILER BALL $c_0$ : VECTOR FROM CAMERA TO $pt_0$ $c_1$ : VECTOR FROM CAMERA TO $pt_1$ $t_0$ : VECTOR FROM TRAILER BALL TO $pt_0$ $t_1$ : VECTOR FROM TRAILER BALL TO $pt_1$

L : VECTOR FROM CAMERA TO TRAILER BALL $\delta$ : ANGLE CHANGE FROM $pt_0$ TO $pt_1$

DETECTING DAMAGE ANGLES FOR A VEHICLE AND TRAILER

This application claims priority to U.S. Provisional Patent Application No. 62/747,955, filed Oct. 19, 2018, the entire contents of which is incorporated by reference in its entirety.

FIELD

Embodiments relate to systems and methods for detecting damage angles for a vehicle and a trailer

BACKGROUND

Having knowledge of the size and structure of a trailer attached to a vehicle is necessary for safely maneuvering a trailer. This is especially true for automated driving systems where a computer or other electronic controller controls the steering of the vehicle and trailer combination. Knowledge of the size and structure is needed to avoid collisions between the vehicle and trailer or the trailer and other objects in a driving environment.

SUMMARY

For example, when reversing with a trailer, the trailer can rotate towards the vehicle. Portions of the trailer can impact and damage the vehicle when the angle between the vehicle and the trailer (in a horizontal plane with respect to the ground) surpasses a certain size. An angle at which damage can occur to a vehicle is considered a "damage angle."

Therefore, a system is needed to assess the dimensions of (for example, determine the dimensions of) a structure of a trailer using a rear-view camera on the back of a vehicle when the trailer is attached to the vehicle and there is relative angular motion of the trailer with respect to the vehicle. After determining the structure of the trailer, the system calculates a damage angle and then informs a user of the vehicle (or an automated control system of the vehicle) to adjust the movement of the vehicle to avoid the damage angle (and avoid a collision between the trailer or structure of the trailer and the vehicle).

One embodiment provides a system for detecting a damage angle between a vehicle and a trailer. The system includes a rear-view camera positioned on a rear portion of the vehicle and configured to obtain video of the trailer and an electronic controller. The electronic controller is configured to receive the video of the trailer from the rear-view camera, determine a damage point based upon the video of the trailer, determine a change in a rotation angle of the trailer, determine a changed location of the damage point of the trailer based upon the change in the rotation angle of the trailer, determine a damage angle based upon the changed location of the damage point relative to the vehicle, and determine at least one maneuver to avoid collision between the damage point and the vehicle based upon the damage angle.

Another embodiment provides a method for detecting a damage angle between a vehicle and a trailer. The method includes receiving, with an electronic controller, video of the trailer from a rear-view camera positioned on a rear portion of the vehicle, determining, with the electronic controller, a damage point based upon the video of the trailer, determining, with the electronic controller, a change in a rotation angle of the trailer, determining, with the electronic controller, a changed location of the damage point of the trailer based upon the change in the rotation angle of the trailer, determining, with the electronic controller, a damage angle based upon the changed location of the damage point relative to the vehicle, and determining, with the electronic controller, at least one maneuver to avoid collision between the damage point and the vehicle based upon the damage angle.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

In addition, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, flash memory, an optical storage device, a magnetic storage device, a ROM (Read Only Memory), a RAM (Random Access Memory), register memory, a processor cache, or any combination thereof.

Figure 1:
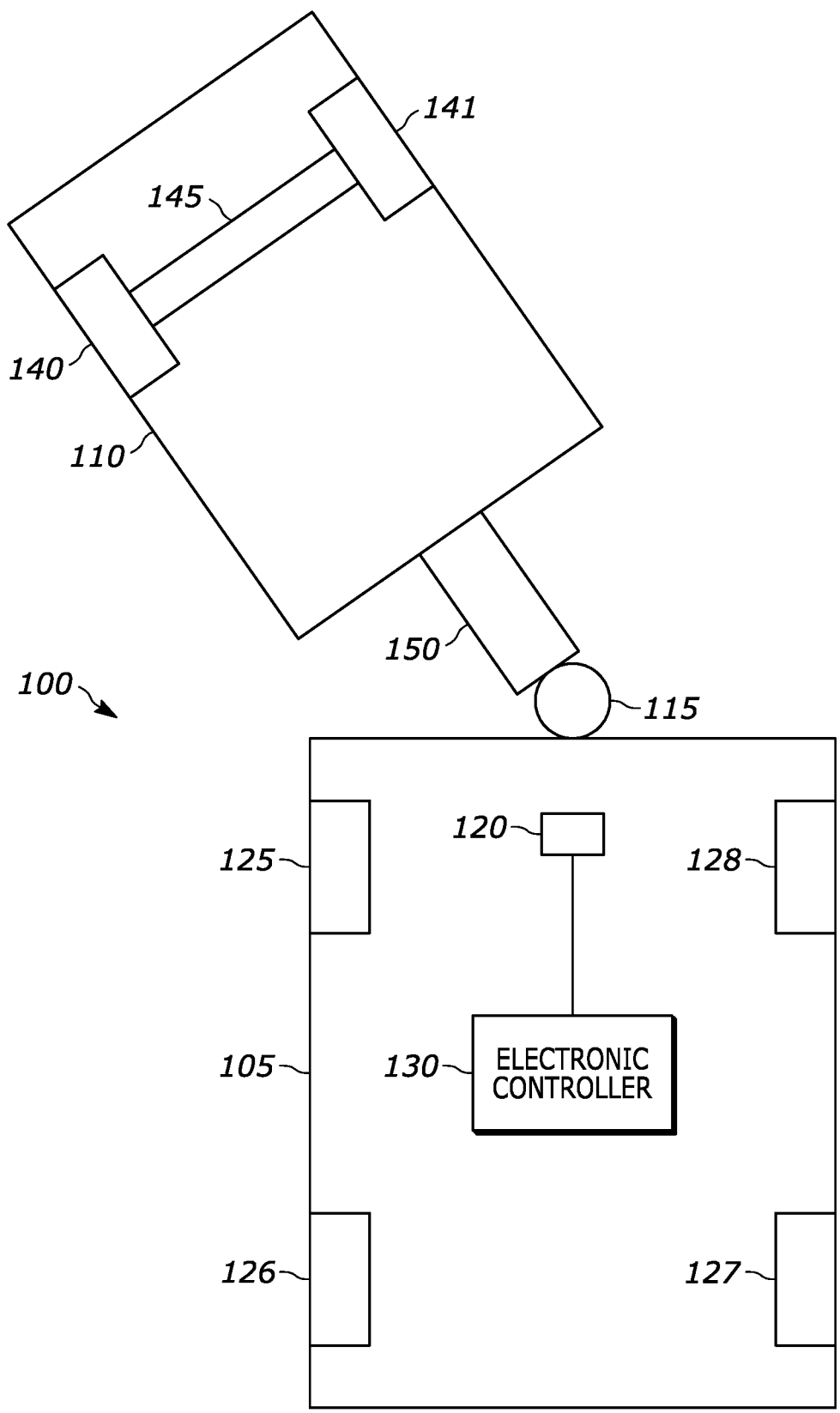
FIG. 1 illustrates a system for detecting damage angles between a vehicle and a trailer according to one embodiment.

FIG. 1 illustrates a system 100 for detecting damage angles between a vehicle 105 and a trailer 110 according to one embodiment. The trailer 110 is coupled to the vehicle 105 at a coupling point 115 (for example, a trailer hitch in the form of a ball). The system also includes a rear-view camera 120 positioned on a rear portion of the vehicle 105. The rear-view camera 120 collects images (for example, video or a series of sequential images of the trailer illustrating a change in position) of the trailer 110, the coupling point 115, and a driving environment of the vehicle 105 and the trailer 110.

The vehicle 105 may be an automobile, a truck, a tractor-trailer, a motorcycle, or the like. In the illustrated embodiment, the vehicle 105 has four wheels 125, 126, 127, and 128. However, in other embodiments, the vehicle 105 may have a different number of wheels. As mentioned above, the vehicle 105 also includes the rear-view camera 120 positioned on a rear portion of the vehicle 105, such as a rear bumper, a trunk lid, a license plate frame, a rear window, a rear portion of a roof of the vehicle 105, and the like. The rear-view camera 120 is configured to obtain video data of the trailer 110.

Figure 2:
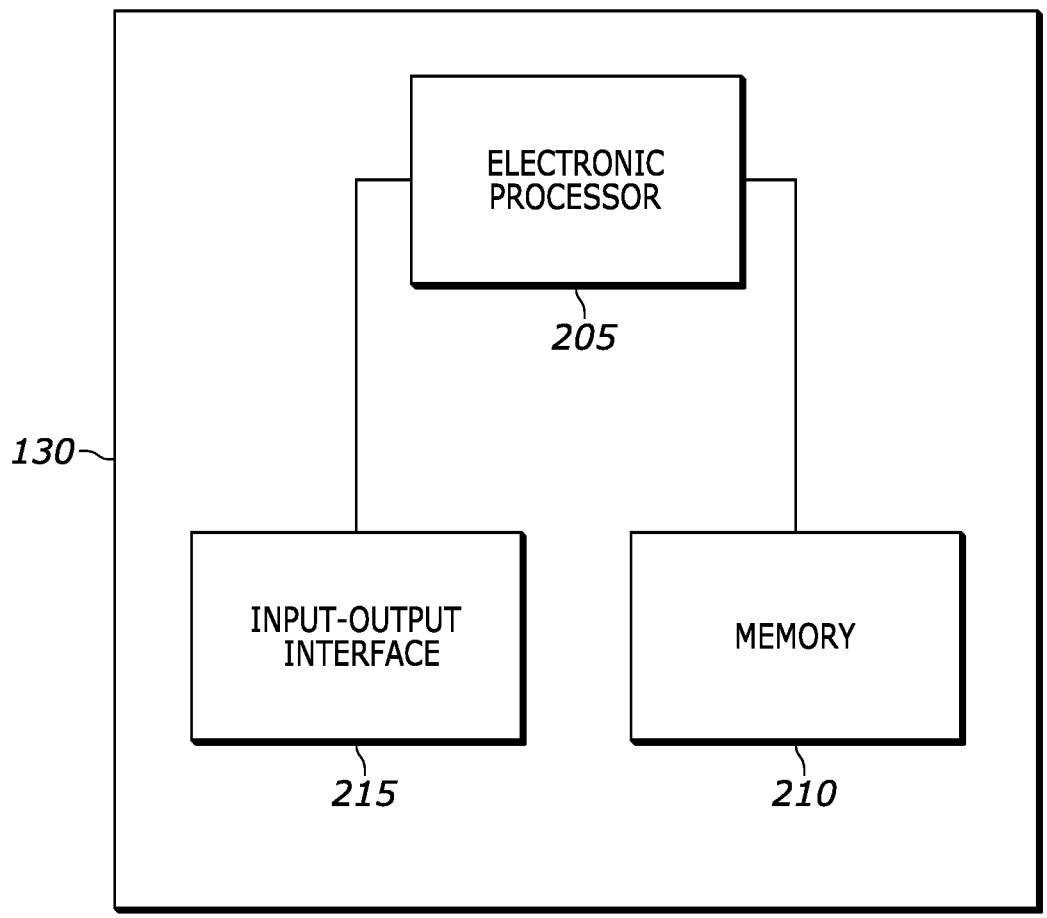
FIG. 2 illustrates an electronic controller according to one embodiment.

The system 100 also includes an electronic controller 130. An example of the electronic controller 130 is illustrated in FIG. 2. The electronic controller 130 includes a plurality of electrical and electronic components that provide power, operation control, and protection to the components and modules within the electronic controller 130. In the example illustrated, the electronic controller 130 includes an electronic processor 205 (such as a programmable electronic microprocessor, microcontroller, or similar device), a memory 210 (for example, non-transitory, machine-readable memory), and an input-output interface 215. The electronic processor 205 is communicatively connected to the memory 210 and the input-output interface 215. The electronic processor 205, in coordination with software stored in the memory 210 and the input-output interface 215, is configured to implement, among other things, the methods described herein.

The electronic controller 130, in some embodiments, may be implemented in several independent controllers (for example, programmable electronic control units) each configured to perform specific functions or sub-functions. Additionally, the electronic controller 130 may contain sub-modules that include additional electronic processors, memory, or application-specific integrated circuits (ASICs) for handling input-output functions, processing of signals, and application of the methods listed below. In other embodiments, the electronic controller 130 includes additional, fewer, or different components.

Returning to FIG. 1, the rear-view camera 120 is electrically connected to the electronic controller 130 and is configured to send video to the electronic controller 130. The vehicle 105 may also include a plurality of sensors that are electrically connected to the electronic controller 130 and configured to send various signals to the electronic controller 130.

The trailer 110 includes at least two trailer wheels 140 and 141 connected by a trailer axle 145. In some embodiments, the trailer 110 may include more wheels connected by the same trailer axle 145 or a separate trailer axle. The trailer 110 also includes a trailer tongue 150, which couples the trailer 110 to the coupling point 115 of the vehicle 105.

Figure 3:
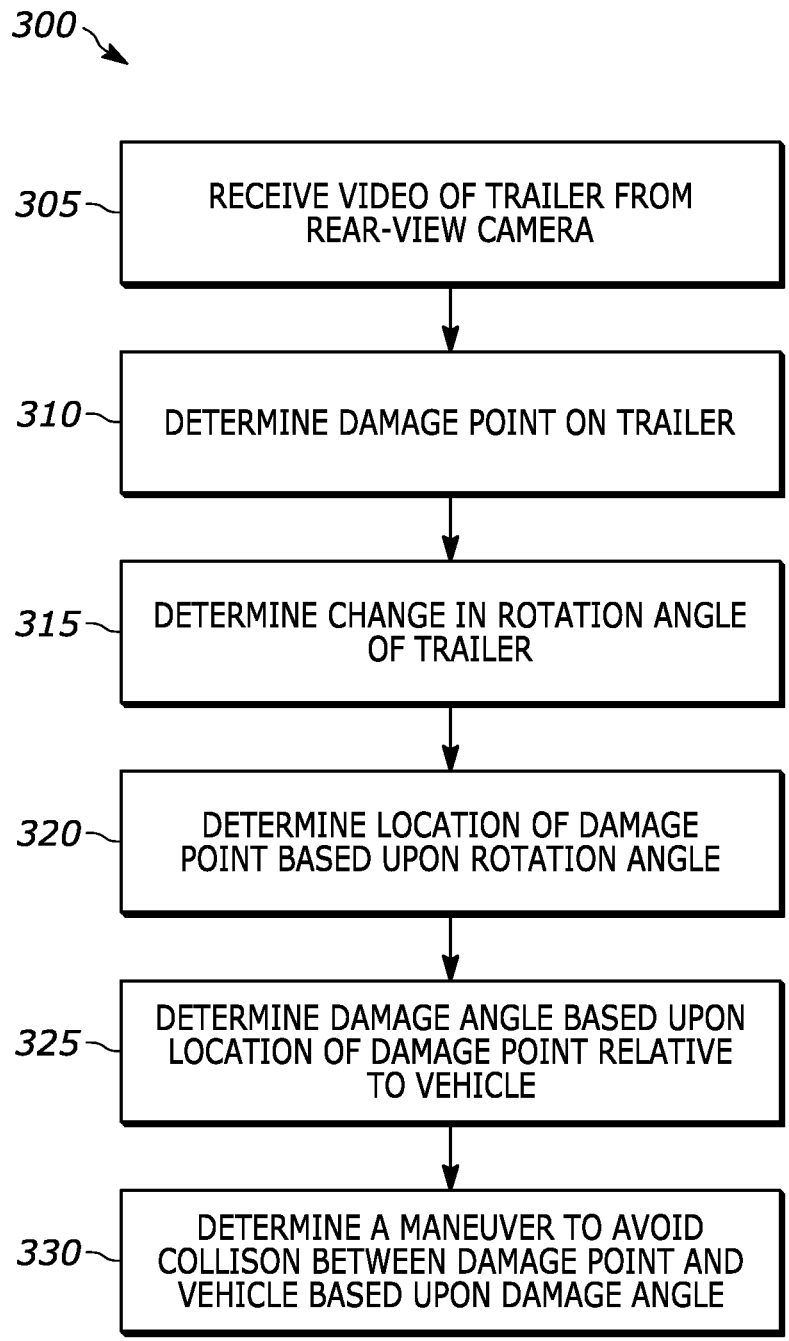
FIG. 3 illustrates a method for detecting damage angles between a vehicle and a trailer according to one embodiment.

FIG. 3 illustrates a method 300 for detecting damage angles between the vehicle 105 and the trailer 110 according to one embodiment.

In one example, the method 300 includes receiving, with the electronic controller 130, video from the rear-view camera 120 (at block 305). The video captured by the rear-view camera 120 includes video of the trailer 110 and, in one example, video of structures of the trailer 110 (such as the trailer tongue 150 or other protrusions on the trailer 110 that may pose a collision threat to the vehicle 105).

In one example, the method 300 also includes determining, with the electronic controller 130, a damage point on the trailer 110 (at block 310). In one embodiment, the electronic controller 130 performs image processing on the video received from the rear-view camera 120 to identify protrusions or other objects that could cause damage to the vehicle 105. For example, the electronic controller 130 may utilize optical flow, corner finding, optical tracking, or other feature detection methods to determine damage points on the trailer 110, for example, protrusions, the trailer tongue 150, and the like. In some embodiments, the electronic controller 130 saves the determined damage points (for example, a camera frame that contains the damage point, an outline of the damage point, or some other indication of the damage point) in the memory 210.

The method 300 also includes determining, with the electronic controller 130, a change in a rotation angle of the trailer 110 (at block 315). In one embodiment, the system 100 includes an angle sensor that senses a rotation angle of the trailer 110 with respect to the vehicle 105 and sends the angle (or, more precisely, a signal indicative of the sensed angle) to the electronic controller 130. In another embodiment, the electronic controller 130 is configured to determine the change in the angle between the trailer 110 and the vehicle 105 by comparing different camera frames of the video sent by the rear-view camera 120 and utilizing image processing to determine the change in rotation angle of the trailer 110 with respect to the vehicle 105.

Figure 4:
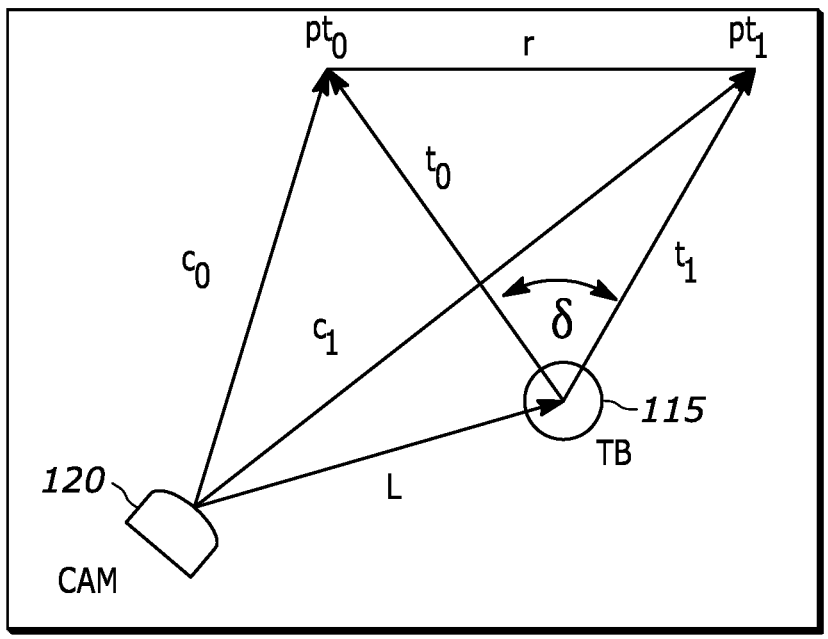
FIG. 4 is a diagram illustrating how a changed location of a damage point is determined according to one embodiment.

In one example, the method 300 also includes determining, with the electronic controller 130, a changed location of the damage point based upon the rotation angle of the trailer 110 (at block 320. For example, FIG. 4 is a diagram 400 showing how the changed location of the damage point is determined.

In one example, the video received from the rear-view camera 120 includes the damage point at a first location ($pt_0$) in a first camera frame and the damage point at a second location ($pt_1$) in a second camera frame which occurs after the first camera frame in the video. The electronic controller 130 determines vectors $c_0$, $c_1$, $t_0$, and $t_1$ based upon the known rotation angle $\delta$ and a known vector L between the rear-view camera 120 and the coupling point 115. Based upon the movement of the damage point from $pt_0$ to $pt_1$ and the resulting determined vectors, the electronic controller 130 determines a changed real-world position of the damage point in relation to the vehicle 105.

For example, $t_0$ is determined by using vector addition to add known vector L to $c_0$ and $t_1$ is determined using vector addition to add known vector L to $c_1$. If the electronic controller 130 is using only data from the video gathered by the rear-view camera 120 to determine a changed real-world position of the damage point in relation to the vehicle 105, only unit vectors $cu_0$ and $cu_1$ can be determined. These vectors are defined below in Equations 1 and 2.

$$c_0 = cu_0 * d_0 \qquad \text{Equation 1:}$$

$$c_1 = cu_1 * d_1 \qquad \text{Equation 2:}$$

In Equations 1 and 2, $d_0$ and $d_1$ are unknown distances between $pt_0$ and $pt_1$ and the rear-view camera 120, respectively. Using these equations in a world coordinate system, such as an xyz coordinate system, the following Equations 3-8 are obtained.

$$t_{x0} = d_0 * cu_{x0} - L_x \qquad \text{Equation 3:}$$

$$t_{y0} = d_0 * cu_{y0} - L_y \qquad \text{Equation 4:}$$

$$t_{z0} = d_0 * cu_{z0} - L_z \qquad \text{Equation 5:}$$

$$t_{x1} = d_1 * cu_{x1} - L_x \qquad \text{Equation 6:}$$

$$t_{y1} = d_1 * cu_{y1} - L_y \qquad \text{Equation 7:}$$

$$t_{z1} = d_1 * cu_{z1} - L_z \qquad \text{Equation 8:}$$

Because the damage point is kept at a constant height, or constant z value, the value of $t_{z0}$ and the value of $t_{z1}$ is the same and can be represented by $t_z$. Using the same height value for both $t_{z0}$ and $t_{z1}$ allows d1 to be represented by Equation 9.

$$d_1 = \frac{d_0 cu_{z0}}{cu_{z1}} \qquad \text{Equation 9}$$

Substituting for $d_1$, the following Equations 10-14 can be determined from Equations 3-8.

$$t_{x0} = d_0 cu_{x0} - L_x \qquad \text{Equation 10:}$$

$$t_{y0} = d_0 cu_{y0} - L_y \qquad \text{Equation 11:}$$

$$t_{x1} = d_0 cu_{x1} - L_x \qquad \text{Equation 12:}$$

$$t_{y0} = d_0 cu_{y1} - L_y \qquad \text{Equation 13:}$$

$$t_z = d_0 cu_{z0} - L_z \qquad \text{Equation 14:}$$

The rotation angle δ is known and that the rotation angle δ is constrained to a plane of rotation about the z-axis of the coupling point 115. Therefore, the following matrix in Equation 15 known.

$$Rot = \begin{matrix} \cos\delta & -\sin\delta & 0 \\ \sin\delta & \cos\delta & 0 \\ 0 & 0 & 1 \end{matrix} \qquad \text{Equation 15}$$

Because the matrix Rot is known, it is known that Equation 16 is true.

$$t_1 = Rot * t_0 \qquad \text{Equation 16:}$$

Because of Equation 16, Equation 17 is also known.

$$t_{x1} = t_x \cos\delta - t_{y0} \sin\delta \qquad \text{Equation 17:}$$

These equations lead to the system of Equations 18-21.

$$A = \begin{matrix} -1 & 0 & 0 & 0 & cu_{x0} \\ 0 & -1 & 0 & 0 & cu_{x0} \\ 0 & 0 & -1 & 0 & cu_{x0} \\ 0 & 0 & 0 & -1 & \frac{cu_{z0}}{cu_{z1}} cu_{x1} \\ -\cos\delta & \sin\delta & 0 & 1 & 0 \end{matrix} \qquad \text{Equation 18}$$

$$b = [L_x \ L_y \ L_z \ L_x \ 0]' \qquad \text{Equation 19}$$

$$x = A \backslash b \qquad \text{Equation 20}$$

$$x = [t_{x0} \ t_{y0} \ t_z \ t_{x1} \ d_0] \qquad \text{Equation 21}$$

Matrix x solves for the changed real-world position of the damage point in relation to the vehicle 105.

Figure 5:
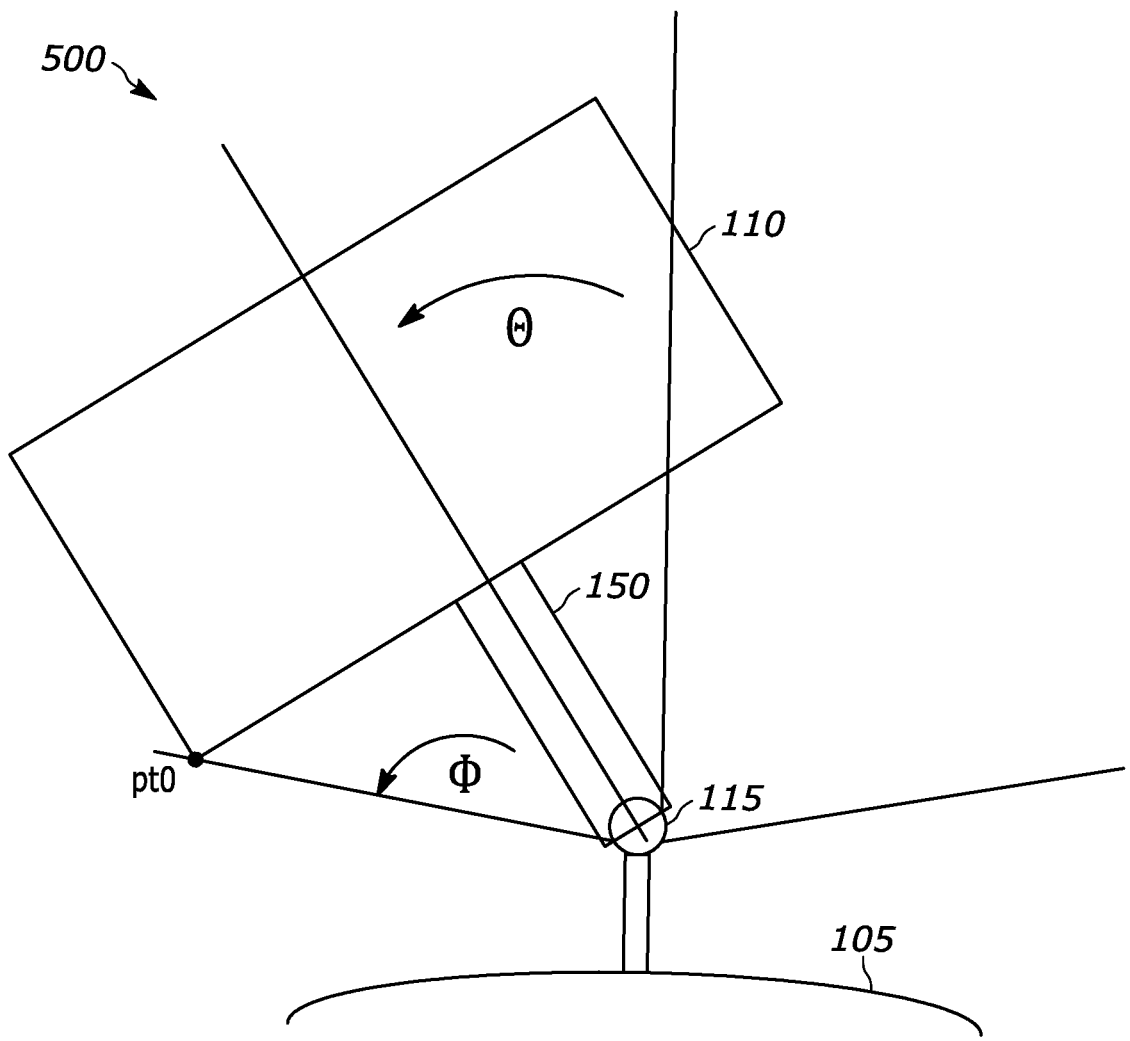
FIG. 5 is a diagram illustrating an exemplary damage angle according to one embodiment.

In one example, the method 300 also includes determining, with the electronic controller 130, a damage angle based upon the changed real-world position of the damage point in relation to the vehicle 105 (at block 325). For example, FIG. 5 illustrates a diagram 500 that shows a damage angle Φ. The damage angle Φ indicates a maximum angle from a current trailer angle Θ that the trailer 110 can turn before the damage point is in danger of colliding with the vehicle 105. The damage angle Φ is determined based upon the current trailer angle θ and the changed location of the damage point.

In one example, the method 300 also includes determining, with the electronic controller 130, a maneuver for the vehicle 105 to avoid a collision between the damage point and the vehicle 105 (at block 330). For example, if the vehicle 105 is an autonomous or semi-autonomous vehicle, the electronic controller 130 may determine a particular angle and speed for a turn and send a signal to a steering system of the vehicle 105 to turn at the particular angle and speed to avoid colliding with the damage point. In other embodiments, the vehicle 105 is driven by an operator, and the electronic controller 130 is configured to determine a particular angle for the operator to turn a steering device of the vehicle 105 at to avoid the collision, and send the angle to a display device to display to the operator of the vehicle 105.

Thus, embodiments described herein provide, among other things, systems and methods for detecting a damage angle between a vehicle and a trailer.

The following examples illustrate example systems and methods described herein. Example 1: a system for detecting a damage angle between a vehicle and a trailer, the system comprising a rear-view camera positioned on a rear portion of the vehicle and configured to obtain video of the trailer and an electronic controller configured to receive the video of the trailer from the rear-view camera, determine a damage point based upon the video of the trailer, determine a change in a rotation angle of the trailer, determine a changed location of the damage point of the trailer based upon the change in the rotation angle of the trailer, determine a damage angle based upon the changed location of the damage point relative to the vehicle, and determine at least one maneuver to avoid collision between the damage point and the vehicle based upon the damage angle.

Example 2: the system of example 1, wherein the electronic controller is further configured to save the damage point in a non-transitory, computer-readable memory.

Example 3: the system of example 1, further comprising an angle sensor.

Example 4: the system of example 3, wherein the angle sensor detects the rotation angle of the trailer and sends a signal indicative of the rotation angle.

Example 5: the system of example 1, wherein the change in the rotation angle is detected by comparing different frames of the video.

Example 6: the system of example 1, wherein the at least one maneuver includes a particular angle and speed for a turn to avoid a collision between the damage point and the vehicle.

Example 7: the system of example 6, wherein the electronic controller is further configured to send the particular angle and speed for the turn to a steering system of the vehicle.

Example 8: the system of example 6, wherein the electronic controller is further configured to send the particular angle and speed for the turn to a display.

Example 9: the system of example 1, wherein the damage angle is a maximum angle from a current trailer angle that the trailer can turn before the damage point is in danger of colliding with the vehicle.

Example 10: the system of example 1, wherein determining the changed location of the damage point includes determining at least one vector based upon the rotation angle and a known vector between the rear-view camera and a coupling point of the trailer.

Example 11: a method for detecting a damage angle between a vehicle and a trailer, the method comprising receiving, with an electronic controller, video of the trailer from a rear-view camera positioned on a rear portion of the vehicle, determining, with the electronic controller, a damage point based upon the video of the trailer, determining, with the electronic controller, a change in a rotation angle of the trailer, determining, with the electronic controller, a changed location of the damage point of the trailer based upon the change in the rotation angle of the trailer, determining, with the electronic controller, a damage angle based upon the changed location of the damage point relative to the vehicle, and determining, with the electronic controller, at least one maneuver to avoid collision between the damage point and the vehicle based upon the damage angle.

Example 12: the method of example 11, further comprising saving, with the electronic controller, the damage point in a non-transitory, computer-readable memory.

Example 13: the method of example 11, further comprising receiving, with the electronic controller, a signal from an angle sensor.

Example 14: the method of example 13, wherein the angle sensor detects the rotation angle of the trailer and the signal is indicative of the rotation angle.

Example 15: the method of example 11, wherein the change in the rotation angle is detected by comparing, with the electronic controller, different frames of the video.

Example 16: the method of example 11, wherein the at least one maneuver includes a particular angle and speed for a turn to avoid a collision between the damage point and the vehicle.

Example 17: the method of example 16, further comprising sending, with the electronic controller, the particular angle and speed for the turn to a steering system of the vehicle.

Example 18: the method of example 16, further comprising sending, with the electronic controller, the particular angle and speed for the turn to a display.

Example 19: the method of example 11, wherein the damage angle is a maximum angle from a current trailer angle that the trailer can turn before the damage point is in danger of colliding with the vehicle.

Example 20: the method of example 11, wherein determining the changed location of the damage point includes determining, with the electronic controller, at least one vector based upon the rotation angle and a known vector between the rear-view camera and a coupling point of the trailer.

What is claimed is:

1. A system for detecting a damage angle between a vehicle and a trailer, the system comprising:
    a rear-view camera positioned on a rear portion of the vehicle and configured to obtain video of the trailer; and
    an electronic controller configured to
        receive the video of the trailer from the rear-view camera;
        determine a damage point based upon the video of the trailer;
        save the damage point in a non-transitory, computer-readable memory;
        determine a change in a rotation angle of the trailer;
        determine a changed location of the damage point of the trailer based upon the change in the rotation angle of the trailer;
        determine a damage angle based upon the changed location of the damage point relative to the vehicle; and
        determine at least one maneuver to avoid collision between the damage point and the vehicle based upon the damage angle.

2. The system of claim 1, wherein the electronic controller is further configured to send a signal to a steering system of the vehicle to avoid colliding with the damage point.

3. The system of claim 1, further comprising an angle sensor.

4. The system of claim 3, wherein the angle sensor detects the rotation angle of the trailer and sends a signal indicative of the rotation angle.

5. The system of claim 1, wherein the change in the rotation angle is detected by comparing different frames of the video.

6. The system of claim 1, wherein the at least one maneuver includes a particular angle and speed for a turn to avoid a collision between the damage point and the vehicle.

7. The system of claim 6, wherein the electronic controller is further configured to send the particular angle and speed for the turn to a steering system of the vehicle.

8. The system of claim 6, wherein the electronic controller is further configured to send the particular angle and speed for the turn to a display device to display to the operator of the vehicle.

9. The system of claim 1, wherein the damage angle is a maximum angle from a current trailer angle that the trailer can turn before the damage point is in danger of colliding with the vehicle.

10. The system of claim 1, wherein determining the changed location of the damage point includes determining at least one vector based upon the rotation angle and a known vector between the rear-view camera and a coupling point of the trailer.

11. A method for detecting a damage angle between a vehicle and a trailer, the method comprising:
    receiving, with an electronic controller, video of the trailer from a rear-view camera positioned on a rear portion of the vehicle;
    determining, with the electronic controller, a damage point based upon the video of the trailer;
    saving, with the electronic controller, the damage point in a non-transitory, computer-readable memory;

determining, with the electronic controller, a change in a rotation angle of the trailer;

determining, with the electronic controller, a changed location of the damage point of the trailer based upon the change in the rotation angle of the trailer;

determining, with the electronic controller, a damage angle based upon the changed location of the damage point relative to the vehicle; and determining, with the electronic controller, at least one maneuver to avoid collision between the damage point and the vehicle based upon the damage angle.

12. The method of claim 11, further comprising sending, with the electronic controller, a signal to a steering system of the vehicle to avoid colliding with the damage point.

13. The method of claim 11, wherein the change in the rotation angle is detected by comparing, with the electronic controller, different frames of the video.

14. The method of claim 11, wherein the at least one maneuver includes a particular angle and speed for a turn to avoid a collision between the damage point and the vehicle.

15. The method of claim 14, further comprising sending, with the electronic controller, the particular angle and speed for the turn to a steering system of the vehicle.

16. The method of claim 14, further comprising sending, with the electronic controller, the particular angle and speed for the turn to a display device to display to the operator of the vehicle.

17. The method of claim 11, wherein the damage angle is a maximum angle from a current trailer angle that the trailer can turn before the damage point is in danger of colliding with the vehicle.

18. The method of claim 11, wherein determining the changed location of the damage point includes determining, with the electronic controller, at least one vector based upon the rotation angle and a known vector between the rear-view camera and a coupling point of the trailer.

19. A method for detecting a damage angle between a vehicle and a trailer, the method comprising:

receiving, with an electronic controller, video of the trailer from a rear-view camera positioned on a rear portion of the vehicle;

receiving, with the electronic controller, a signal from an angle sensor;

determining, with the electronic controller, a damage point based upon the video of the trailer;

saving, with the electronic controller, the damage point in a non-transitory, computer-readable memory;

determining, with the electronic controller, a change in a rotation angle of the trailer;

determining, with the electronic controller, a changed location of the damage point of the trailer based upon the change in the rotation angle of the trailer;

determining, with the electronic controller, a damage angle based upon the changed location of the damage point relative to the vehicle; and determining, with the electronic controller, at least one maneuver to avoid collision between the damage point and the vehicle based upon the damage angle.

20. The method of claim 19, wherein the angle sensor detects the rotation angle of the trailer and the signal is indicative of the rotation angle.

* * * * *